United States Patent [19]

Tucek

[11] 4,180,274

[45] Dec. 25, 1979

[54] CYLINDER ASSEMBLY WITH SPLIT RING RETAINER

[75] Inventor: Frank J. Tucek, Wausau, Wis.

[73] Assignee: J. I. Case Company, Racine, Wis.

[21] Appl. No.: 896,462

[22] Filed: Apr. 14, 1978

[51] Int. Cl.² .............................................. F16J 15/18
[52] U.S. Cl. ................................ 277/192; 277/188 R; 92/255
[58] Field of Search ........................ 92/252, 255, 256; 277/188, 197

[56] References Cited

U.S. PATENT DOCUMENTS

| 3,165,032 | 1/1965 | Konkle | 92/256 |
| 4,089,253 | 5/1978 | Visser | 92/255 |

Primary Examiner—Robert I. Smith
Attorney, Agent, or Firm—Arthur J. Hansmann

[57] ABSTRACT

A cylinder assembly with split ring retainer having a hollow cylinder and a piston slidable therein and a rod extending from the cylinder. A cylinder head is attached to one end of the cylinder and surrounds the rod for supporting the rod. A split ring is disposed adjacent the piston and the cylinder head for respectively holding the piston onto the rod and for holding the cylinder head at its location with the end of the cylinder. The split ring and its cooperating adjacent part have inter-engaged tongue and groove inter-engagements for holding them together, and there is a member, such as a snap ring, for holding the split ring radially inwardly and against the part to which it is attached.

7 Claims, 11 Drawing Figures

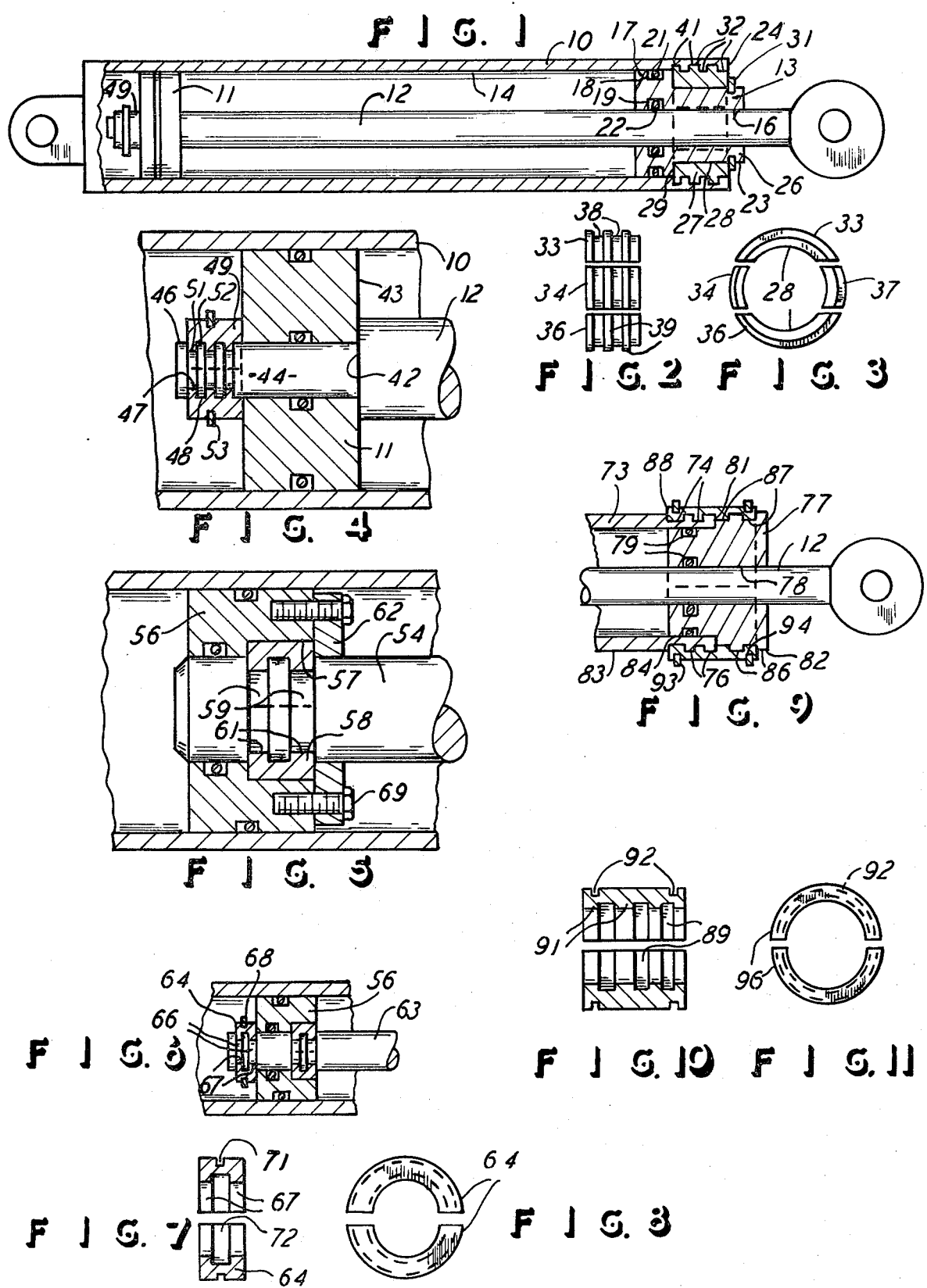

CYLINDER ASSEMBLY WITH SPLIT RING RETAINER

This invention relates to a cylinder assembly with split ring retainer, and, more particularly, it relates to a fluid cylinder assembly which has at least one split ring serving as a retainer for holding either the piston to the rod or the cylinder head to the cylinder.

BACKGROUND OF THE INVENTION

The prior art is already aware of many different arrangements for connecting pistons to piston rods and for attaching cylinder heads and glands or the like to the end of a cylinder. These arrangements include contsructions which do not utilize threaded inter-connections, such as threading a piston rod into a piston or a cylinder head into the end of a cylinder. That is, the arrangements already known and used for attaching pistons to rods and attaching cylinder heads to cylinders commonly include threaded members and members which require close tolerances and several parts for achieving the attachments. In those prior art arrangements, the cylinder assemblies are expensive to manufacture and to repair, but they do not necessarily produce a more efficiently operating assembly. Also, special tools are frequently required for assembling and repairing the prior art assemblies.

In the present invention, the attachment of the piston to the rod and of the cylinder head to the cylinder is accomplished without the use of threaded means or other fasteners or other types of connections, including welding, all of which bear axial force transmitted between the aforesaid connected parts. Prior art examples of the utilization of and therefore the requirement for relying upon threaded means or other types of connections for resisting axial forces between the connected parts are found in British Pat. No. 718583 and U.S. Pat. Nos. 748233 and 970903 and 1,521,388 and 1,538,132 and 2,729,523 and 3,108,514 and 3,115,071 and 3,168,301.

The prior art is also aware of connections between a piston and a piston rod utilizing a groove in the rod and a split ring nested in the groove and somehow held relative to the piston. Examples of such prior art are found in U.S. Pat. Nos. 3,055,719 and 3,397,893 and 3,426,656 and 3,426,657 and 3,457,842 and 4,004,499. Of these patents, the first two have the split ring extending to the outer circumference of the piston itself and the piston is therefore necessarily made in two halves and a number of additional parts. The multiple piece piston arrangement is also shown in the last two patents listed above, and, in all of this list, the showings are limited to having a separate split ring for each single groove in the piston rod. As such, either special arrangements are made for entraping the split ring relative to the rod or for bearing down axially on the split ring for firmly holding it axially of the rod. Thus, U.S. Pat. Nos. 3,426,656 and 3,426,657 require a threaded member in the form of a slip-fit locking nut which axially bears against the single split ring. Also distinguishable over the invention herein is the showing in U.S. Pat. No. 3,457,842 which has a split ring held by a required bearing band, both of which extend to the cylinder wall itself and must therefore be fitted relative to the wall for sliding thereon. Finally, U.S. Pat. No. 4,004,499 shows an arrangement of a single rod groove and a single tongue or split ring nested in the groove and a fitted end ring 12 is shown and is part of the piston itself, all for holding the split ring in position on the rod.

The present invention employs the split ring principle wherein there is a plurality of projections or tongues and grooves within one split ring, and no threaded member or fitted band or the like is required to hold the split ring radially inwardly against its connecting part, such as the piston rod or the cylinder head. Therefore, an inexpensive but sturdy and reliable connection is possible between the piston and the rod and between the cylinder head and the cylinder, and the split ring may be employed at either or both those locations.

The further object of this invention is to provide either or both of the aforesaid connections by utilizing a split ring at the location where a threaded member has been commonly heretofore utilized. That is, the split ring can replace a threaded connection between the rod and the piston, or on the end of the rod to hold the piston against a shoulder on the rod, and it can be used to replace the threaded connection between the cylinder head and the cylinder itself. As such, there is improved serviceability and reduced cost and the connection can actually be sturdier than that provided by conventional threading.

Other objects and advantages will become apparent upon reading the following description in light of the accompanying drawings.

BRIEF DESCRIPTION OF THE DRAWINGS

FIG. 1 is a longitudinal sectional view of a cylinder assembly showing this invention applied at the cylinder head.

FIGS. 2 and 3 are side elevational and end elevational views of the split ring shown in FIG. 1.

FIG. 4 is an enlarged fragmentary view of the piston end of the assembly shown in FIG. 1.

FIG. 5 is a view similar to FIG. 4 but showing a different arrangement of utilizing a split ring.

FIG. 6 is a view similar to FIG. 4, on a reduced scale, showing the utilization of two split rings.

FIGS. 7 and 8 are sectional and end elevational views, on an enlarged scale, of the split ring on the end of the piston in FIG. 6.

FIG. 9 is a view of a fragment of the assembly of FIG. 1, with a somewhat different arrangement and on an enlarged scale and showing the cylinder head.

FIGS. 10 and 11 are sectional and end elevational views, respectively, of the split ring shown in FIG. 9.

DETAILED DESCRIPTION OF THE PREFERRED EMBODIMENTS

The drawings show the cylinder assembly which generally includes the elongated and hollow cylinder 10 and piston 11 and piston rod 12 and cylinder head 13. Of course the cylinder head is of a hollow cylindrical configuration having an inner circumferential wall 14 on which the circular piston 11 will slide, and the rod 12 will slide back and forth through the circular opening 16 in the cylinder head 13 which therefore guides and supports the axially sliding rod 12. That is an arrangement of a substantially conventional cylinder assembly, except as it is shown in FIG. 1 and in the remainder of the drawings herein, and thus the assembly 10 is of a fluid cylinder assembly.

The cylinder head 13 is cylindrically shaped and has a portion 17 which has circular grooves 18 and 19 on the inner and outer circumferences thereof, and O-rings 21 and 22 are disposed in the respective grooves 18 and 19 for sealing the cylinder head with the cylinder wall 14 and with the piston rod 12, respectively. The cylinder head 13 also has a reduced circumferential portion 23 which extends along the length of the axis of the assembly as shown in FIG. 1 and it actually extends beyond the end 24 of cylinder 10 in an extended portion 26. A multi-piece split ring 27 is disposed intermediate the cylinder portion 23 and the cylinder 10, and the ring 27 has essentially an endless inner circumferential surface 28 which snugly fits over the outer circumference or wall 23 of the cylinder head 13. Also, the cylinder head 13 has a shoulder 29 which is in abuttment with the adjacent end of the split ring 27, and a releaseable spring type of snap ring 31 is engaged in the shown groove in the cylinder head portion 26 and extends into contact with the outer end wall of the snap ring 27, as shown, and thus the snap ring 27 is axially fixed between the wall 29 and snap ring 31.

Finally, it will be seen and understood that the snap ring 27 and the cylinder 10 both have a plurality of tongues and grooves designated 32 and which are internested and engaged for restraining relative axial movement between the split ring 27 and the cylinder 10. FIGS. 2 and 3 show views of the split ring 27 which is shown to be actually in four pieces 33, 34, 36, and 37. Of course the showings in FIGS. 2 and 3 show the split ring 27 in its somewhat extended or separated position, and it will be understood that when the ring 27 is in the assembled position of FIG. 1, then the ring 27 has its four segments in substantially endless contacting positions with each other to form one continuous ring or circle.

FIGS. 2 and 3 further show that the ring 27 has at least two grooves 38 and three ribs or tongues 39 which extend beyond the grooves 38 and those tongues 39 actually extend into grooves 41 extending endlessly around the interior wall 14 of the cylinder 10. Therefore, the connection described at the right end of the cylinder assembly as viewed in FIG. 1 presents a plurality of tongues and grooves on both of the split ring 27 and the cylinder 10, and therefore not just a single split ring projection and a single groove are relied upon or provided to make that connection between the cylinder head 13 and the cylinder 10, as shown and described.

FIG. 4 shows the split ring connection of this invention applied to the connection between the piston 11 and the rod 12, and here it will be seen that the rod 12 has a shoulder 42 against which the piston face 43 is in abuttment, and the rod thus has a reduced portion 44 extending through the piston 11 in an extending end 46. The rod end 46 has a plurality of tongues or ribs 47 and grooves 48, and there is a split ring 49 endlessly surrounding the rod end 46. The split ring 49 has matching tongues 51 and grooves 52 for nesting with the plurality of tongues and grooves 47 and 48 on the rod end 46, as shown in FIG. 4. The split ring 49 in FIG. 4 is in two halves and is held radially inwardly by a snap ring 53. With this arrangement, the split ring 49 replaces a threaded connection or nut or the like on the end of the rod 12, and thus a sturdy but yet inexpensive and easily assembled and disassembled connection is made between the piston 11 and rod 12.

FIG. 5 shows a somewhat different arrangement for making a connection between a piston rod 54 and a piston 56, and here it will be seen that the piston 56 has a cylindrical countersunk opening 57 which receives a two-half split ring 58, and again the connection is such that the rod has a plurality of grooves 59 and the split ring 58 has a plurality of ribs or tongues 61, and they both have the other feature, the tongue and groove arrangement; note also that there is a plurality of tongues and grooves interengaged between the rod 54 and piston 56, as shown. A plate 62 extends over the split ring 58 and along the face of the piston 56 for holding the piston 56 relative to the split ring 58.

FIG. 6 shows a rod 63 and the piston 56, but here it will be seen that another split ring 64 is disposed on the forward face of the piston 56 and engages the piston rod groove 66 by means of the split ring ribs or tongues 67. Also, a snap ring 68 extends around the split ring 64 to hold it radially inwardly on the rod 63.

Therefore, in the showings in FIGS. 4, 5, and 6 the split ring is utilized for making the connection between the respective rod and piston shown, and no threaded connection there-between is required for axially securing the piston to the rod, except for the threaded screws 69 in FIG. 5 which only secure the piston to the rod with respect to retracking movement of the rod 54 and not with respect to the primary or power stroke thereof which would be to the left in FIG. 5. FIGS. 7 and 8 show the split ring 64 which is shown in two halves, and again it will be understood that the halves are in contact in the assembled position and form an endless ring or circle around the end of the rod 63, and here the snap ring groove 71 is shown for receiving the snap ring 68. Also, the split ring tongues 67 are shown and the intermediate groove 72 is shown and that receives the tongue or rib shown extended on the rod 63 and into the split ring groove 72.

FIG. 9 shows the cylinder head section of the cylinder assembly, such as at the right end in FIG. 1, and here it will be seen that there is a cylinder 73 having a plurality of grooves 74 and a plurality of tongues 76 on the end thereof and extending endlessly around the outer circumference thereof. Also, there is a cylinder head 77 which has its interior cylindrical opening 78 for snugly slidably receiving the rod 12 and supporting and guiding the rod. Further, the head 77 has its grooves and seals at 79, such as shown in FIG. 1. It will be further seen and understood that the cylinder head 77 extends beyond the cylinder end wall 81 in a portion 82, and the extending portion 82 has an outer circumference the same as the outer circumference designated 83 on the cylinder 10. Further, the cylinder head 77 has an outer circumference 84 which is snugly nested within the cylinder inner circumference or wall 14, all as shown in FIG. 9. Also, the cylinder head 77 has tongues 86 and two grooves 87. With that arrangement, the tongues and grooves on the cylinder 73 are of the same circumference and size in length and the like as the tongues and grooves on the cylinder head 77 which therefore forms a continuation and an extention and repetition of the tongues and grooves on the cylinder 73.

The cylinder 73 and the cylinder head 77 are connected together by means of the split ring 88 which is in two halves, as shown in FIGS. 10 and 11, and the split ring 88 has a plurality of grooves 89 and ribs or tongues 91 which are mated with the tongues and grooves of both the cylinder 73 and the cylinder head 77. That is, the split ring 88 is cylindrical in shape and extends beyond the end 81 of the cylinder 73 and extends over the extending portion 82 of the cylinder head 77 and thus forms the connection between the cylinder 73 and the cylinder head 77, as shown and described. Further, the split ring 88 has two snap ring grooves 92 extending endlessly there-around, and two snap rings 93 and 94 are disposed within the respective grooves 92 for holding the split ring two halves 96 together in one endless ring in assembled form in FIG. 9 and thus radially inwardly. Of course the snap rings 93 and 94 provide for ready disassembly of the connection, but the strength of the assembly is provided by the strength of split ring 88 which does not require any threads, and the tongues and grooves provide sufficient stock or material for transmitting large axial forces between the cylinder 73 and cylinder head 77.

With the arrangements shown, and regarding the connections between the pistons and the rods and between the cylinder and the cylinder heads, either or both of these connections can be utilized in one cylinder assembly. In both instances, the split ring is utilized for the ready and easy assembly and disassembly of the connection, and it provides the necessary strength and does not require any threaded parts. In all instances, it is intended that there be a plurality of tongues and grooves on both of the inter-engaged parts which include the split rings described and shown herein; and thus only one split ring present a plurality of tongues and grooves, and the arrangement is employed for desired strength and so that close tolerances need not be maintained but yet in the ultimate assembly there will be a close fit effected in the connection by that particular split ring shown and described.

What is claimed is:

1. A cylinder assembly with split ring retainer, comprising a hollow cylinder, a piston snugly slidable in said cylinder, a piston rod extending into said cylinder and attached with said piston, a cylinder head attached to one end of said cylinder and surrounding said rod for slidably supporting said rod, a split ring having radial segments and being located at least at one of the connections between said piston and said rod and between said cylinder head and said cylinder for effecting the connection thereat, said one of said rod and said cylinder each having a plurality of radially faced tongues-and-grooves extending therealong in side-by-side relation, said split ring being of an axial length to extend across all said tongues-and-grooves and having its own tongues-and-grooves nested with the first-mentioned said tongues-and-grooves to thereby form an inter-engaged connection for releasably effecting at least one of said connections, and a member included in said assembly and releasably engaged with said split ring for radially restricting said split ring in its aforesaid position of connection.

2. The cylinder assembly with split ring retainer as claimed in claim 1, wherein said split ring is inter-engaged with said rod and said piston, said rod extending into said piston and said split ring being disposed in contact with both said rod and said piston.

3. The cylinder assembly with split ring retainer as claimed in claim 2, wherein said rod has a circumferential groove therein adjacent said piston, and said split ring radial segments forming an endless ring in contact with said rod and having an endless tongue disposed in said circumferential groove.

4. The cylinder assembly with split ring retainer as claimed in claim 1, wherein said split ring is inter-engaged with said cylinder head and said cylinder, and said split ring radial segments forming an endless ring in contact with said cylinder head and also with said cylinder.

5. The cylinder assembly with split ring retainer as claimed in claim 4, wherein said cylinder head and the end of said cylinder adjacent said head both have said tongue-and-groove formations thereon presenting one length of said tongues and grooves, and said split ring has tongue-and-groove formations disposed axially therealong for a distance of said one length and inter-engaged with said tongues and grooves of both said cylinder head and said cylinder for restraining said cylinder head axially of said cylinder.

6. The cylinder assembly with split ring retainer as claimed in claims 1, 2, or 5, wherein said assembly is a snap ring extending around said split ring for releasably holding said split ring radially inwardly.

7. The cylinder assembly with split ring retainer as claimed in claim 5, wherein said tongues and grooves on said cylinder head and said cylinder are faced radially outwardly, and said tongues and grooves on said split ring are faced radially inwardly.

* * * * *